US008121152B2

(12) United States Patent
Cho et al.

(10) Patent No.: US 8,121,152 B2
(45) Date of Patent: Feb. 21, 2012

(54) METHOD FOR ENCODING BROADCAST CHANNEL PROTOCOL DATA UNIT BASED ON BROADCAST CONTROL CHANNEL SCHEDULING ERROR IN UNIVERSAL MOBILE TELECOMMUNICATIONS SYSTEM (75) Inventors: Yunhee Cho, Daejeon (KR); Ji Yeon Kim, Daejeon (KR); Gweon Do Jo, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1244 days.

(21) Appl. No.: 11/828,105

(22) Filed: Jul. 25, 2007

(65) Prior Publication Data

US 2008/0137637 A1    Jun. 12, 2008

(30) Foreign Application Priority Data

Dec. 7, 2006  (KR) .......................... 10-2006-0124179
Apr. 24, 2007  (KR) .......................... 10-2007-0039727

(51) Int. Cl.
*H04J 3/00* (2006.01)

(52) U.S. Cl. ........ 370/476; 370/252; 370/342; 370/345; 370/441; 370/442; 370/473

(58) Field of Classification Search .................. 370/310, 370/310.2, 319, 320, 321, 328, 331, 332, 370/333, 335, 336, 337, 342–345, 241, 241.1, 370/242, 245, 248, 249, 252, 300; 455/423, 455/560; 714/51, 52, 712, 748
See application file for complete search history.

(56) References Cited

U.S. PATENT DOCUMENTS

| | | | | |
|---|---|---|---|---|
| 6,874,113 B2 * | 3/2005 | Chao et al. | ..................... | 714/748 |
| 7,035,669 B2 * | 4/2006 | Hashimoto | .................... | 455/560 |
| 7,581,147 B2 * | 8/2009 | Chao et al. | ..................... | 714/712 |
| 2002/0001314 A1 | 1/2002 | Yi et al. | | |
| 2003/0061557 A1 * | 3/2003 | Chao et al. | ..................... | 714/748 |
| 2005/0265301 A1 | 12/2005 | Heo et al. | | |
| 2006/0126541 A1 * | 6/2006 | Park | .............................. | 370/300 |

FOREIGN PATENT DOCUMENTS

| | | |
|---|---|---|
| KR | 10-2001-0064236 | 7/2001 |
| KR | 10-2005-0063588 | 6/2005 |
| KR | 10-2006-0025819 | 3/2006 |
| KR | 10-2006-0060766 | 6/2006 |

OTHER PUBLICATIONS

Notice of Allowance dated Sep. 30, 2008, for Korean application No. 10-2007-0039727.

* cited by examiner

*Primary Examiner* — Hassan Phillips
*Assistant Examiner* — Mark A Mais
(74) *Attorney, Agent, or Firm* — Lowe Hauptman Ham & Berner, LLP (57) ABSTRACT

A method for encoding a broadcast channel protocol data unit (BCH PDU) based on a broadcast control channel (BCCH) scheduling error in a universal mobile telecommunications system (UMTS) having a Node B and a radio network controller includes setting up a call between the radio network controller and the Node B to receive system information and scheduling information for a system information update from the radio network controller; initializing broadcast channel protocol data units and control information for every system frame number (SFN) at the Node B; and detecting the broadcast control channel scheduling error on the scheduling information for the system information update based on segment types of the system information when combining the system information for every system frame number. In case the broadcast control channel scheduling error is not detected, the broadcast channel protocol data units are encoded to be incorporated therein the system information.

11 Claims, 8 Drawing Sheets

| segType | sibHdrSize (in bits) | sibHdrParameters (Size in bits) |
|---|---|---|
| SEG_TYPE_FIRST | 9 | SibType(5), segCount-1(4) |
| SEG_TYPE_FIRST_SHORT | 17 | SibType(5), segCount-1(4), length-1(8) |
| SEG_TYPE_SUBSEQUENT | 9 | SibType(5), segIndex-1(4) |
| SEG_TYPE_LAST | 9 | SibType(5), segIndex-1(4) |
| SEG_TYPE_LAST_SHORT | 17 | SibType(5), segIndex-1(4), length-1(8) |
| SEG_TYPE_COMB_SIB | 5 | SibType(5) |
| SEG_TYPE_COMB_SIB_SHORT (In case of the first Complete SIB_Short) | 17 | SIBCount-1(4), SibType(5), length-1(8) |
| SEG_TYPE_COMB_SIB_SHORT | 13 | SibType(5), length-1(8) |

400 — SEG_TYPE_FIRST
402 — SEG_TYPE_FIRST_SHORT
404 — SEG_TYPE_SUBSEQUENT
406 — SEG_TYPE_LAST
408 — SEG_TYPE_LAST_SHORT
410 — SEG_TYPE_COMB_SIB
412 — SEG_TYPE_COMB_SIB_SHORT

METHOD FOR ENCODING BROADCAST CHANNEL PROTOCOL DATA UNIT BASED ON BROADCAST CONTROL CHANNEL SCHEDULING ERROR IN UNIVERSAL MOBILE TELECOMMUNICATIONS SYSTEM

CROSS REFERENCE TO RELATED APPLICATION

This application claims priorities to and the benefits of Korean Patent Application Nos. 10-2006-0124179 & 10-2007-0039727 filed in the Korean Intellectual Property Office on Dec. 7, 2006 & Apr. 24, 2007. The contents of these documents is hereby incorporated by reference in their entirety.

FIELD OF THE INVENTION

The present invention relates to a scheduling error detection and PDU (Protocol Data Unit) encoding method for use in UMTS (Universal Mobile Telecommunications System); and, more particularly, to a method for encoding a broadcast channel protocol data unit (BCH PDU) based on a broadcast control channel (BCCH) scheduling error in UMTS, which is for use at a Node B of UMTS.

BACKGROUND OF THE INVENTION

In general, UMTS is a third generation mobile communications system that has evolved from GSM (Global System for Mobile communication), the standard in Europe. The UMTS provides a variety of services by combining radio access networks with WCDMA (Wideband Code Division Multiple Access) techniques based on GSM. The UMTS standard is being developed by a standards organization called as 3GPP ($3^{rd}$ Generation Partnership Project). 3GPP proposes a standard including therein more improved functions with a progress of development stages, where the development stages for standardization are classified by release numbers.

Figure 1:
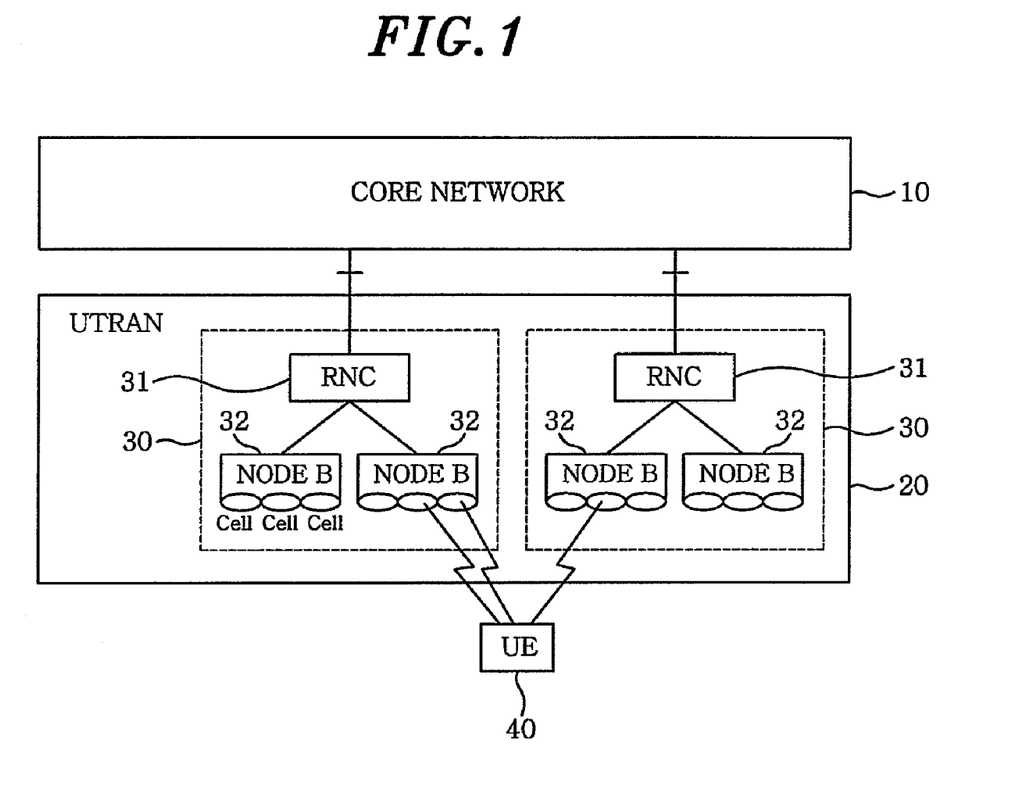
FIG. 1 is a block diagram schematically illustrating a UMTS to which the present invention is applied.

FIG. 1 is a block diagram schematically illustrating UMTS to which the present invention is applied.

Referring to FIG. 1, reference numeral 10 indicates a core network, reference numeral 20 indicates a UTRAN (UMTS Terrestrial Radio Access Network), reference numeral 30 represents an RNS (Radio Network Subsystem), reference numeral 31 refers to an RNC (Radio Network Controller), reference numeral 32 indicates a Node B (base station), and reference numeral 40 represents a UE (User Equipment).

In general, UMTS includes the core network 10, the UTRAN 20 and the UE 40, where the core network 10 has all network elements relating to subscriber call control, session management, mobility management, intra-network switching and the like. The network elements of the core network 10 can be classified into nodes belonging to a circuit-switched area, a packet-switched area, and a register area. The circuit-switched area includes an MSC/VLR (Mobile Switching Center/Visitor Location Resister) and a GMSC (Gateway Mobile Switching Center), which can be physically located in the same apparatus. The MSC/VLR controls circuit-switched connection; performs mobility management such as location update, location registration and paging; and secures data. The GMSC plays a role as a gateway connecting the circuit-switched area to an external network.

The UTRAN 20 is connected to three domains of the core network 10. That is, it is connected to a circuit-switched domain for circuit switching, to a packet switched domain for packet switching, and to a broadcasting domain for a broadcasting service.

The RNC 31 in the UTRAN 20 controls elements of the RNS 30 to dynamically allocate wireless resources of the UTRAN 20. Further, it performs a switching function for transferring data received from the UTRAN 20 to suitable nodes. Since the RNC 31 is directly connected to the core network 10, it serves as a service access point for all the services provided by the core network 10.

The Node B 32 functions as a physical layer in UTRAN 20, and transmits and receives data over an air interface. The Node B 32 sets wireless physical channels for use in exchanging data with the UE 40 based on control information received from the RNC 31, converts data received from an upper layer thereof to have a suitable form for the wireless environment and transmits it to the UE 40. Further, the Node B 32 transmits data received from the UE 40 to the upper layer.

The UE 40 is provided with a USIM (UTMS Subscriber Identity Module) card. Since the USIM card storing therein information on the user identity is detachable from the UE 40, a standard interface between the USIM card and the UE 40, which is called "Cu" interface, is defined. Herein, the concept of the USIM card might not be clear, but the USIM card can be physically implemented in the form of an IC (Integrated Circuit) card and include various applications or several USIM functions.

Further, a BCH PDU generation function of UMTS performed using a system information update procedure between the RNC 31 and the Node B 32 and BCH scheduling information within the Node B 32 preferably meets 3GPP specification requirements (3GPP TS 255.433 UTRAN Iub interface NBAP signaling and 3GPP TS 25.331 Radio Resource Control (RRC) protocol specification). Further, a success of performing the above-described process without an error on a BCH PDU length depends on whether a scheduling algorithm of the RNC 31 has a method for detecting an error on the BCH PDU length and the Node B 32 can immediately detect an error.

The system information update procedure performs operations required for the Node B 32 to accurately schedule system information segments on the BCH. This procedure is initiated when a CRNC (Controlling RNC) transmits a system information update request message to the Node B 32. At that time, the Node B 32 needs to update MIB (Master Information Block), SB (Scheduling Block) and SIB (System Information Block) information included in the system information update request message to the BCH schedule.

In UMTS, before data is broadcasted to the UE 40 via the RNC 31 and the Node B 32, (1) system information update procedure, (2) system information BCH PDU generation procedure, and (3) system information BCH PDU transmission procedure are performed, which will be described in sequence.

(1) System Information Update Procedure (See, 3GPP TS25.433 UTRAN Iub Interface NBAP Signaling)

This procedure is initiated with a system information update request message sent from the RNC 31. The system information includes one MIB segment, two SB segments and 27 SIB segments.

This message includes segment information (i.e., types and lengths of the MIB, SB and SIB segments) and scheduling information (i.e., IB_SG_REP and IB_SG_POS) indicating a transmission start time of each segment.

The Node B 32 sends a system information update response message to the RNC 31 to indicate success if a physical channel scheduling cycle can be updated using parameters included in the system information update request message. Otherwise, the Node B 32 sends a system information update failure message to the RNC 31 to thereby indicate failure.

(2) System Information BCH PDU Generation (See, 3GPP TS 25.331 Radio Resource Control (RRC) Protocol)

The Node B 32 combines information of the segmented system information blocks received in the system information update procedure and then, attaches thereto header information such as an SFN (System Frame Number), a combination type and a segment length. Thereafter, the Node B performs the ASN.1 (Abstract Syntax Notation One) encoding, thereby generating a system information BCH PDU of 246 bits to be transmitted to the UE 40.

The segments can be classified into four types: First segment, Subsequent segment, Last segment, and Complete.

The Node B 32 generates the system information BCH PDU by combining one or more segments having various lengths, where the system information BCH PDU can be defined as one of eleven combination types: No segment; First segment; Subsequent segment; Last segment; Last segment+First segment; Last segment+one or several Complete; Last segment+one or several Complete+First segment; one or several Complete; one or several Complete+First segment; one Complete of size 215 to 226; and Last segment of size 215 to 222.

(3) System Information BCH PDU Transmission (See, 3GPP TS 25.331 Radio Resource Control (RRC) Protocol)

The Node B 32 sends the system information RRC PDU to the UE 40 at every 20 ms over a PCCPCH (Primary Common Control Physical Channel), the system information RRC PDU being generated according to the scheduling information (IB_SG_REP, IB_SG_POS and SEG_COUNT) indicating the transmission start time of each segment received in the system information update procedure. Here, the transmission start time (i.e., SFN) is expressed as:

$$\text{SFN mod IB\_SEG\_REP} = \text{IB\_SEG\_POS}(i), \ i=0, 1, 2, \ldots, \text{SEG\_COUNT}-1.$$

At this time, each segment is scheduled with a specific repetition rate and a specific position based on the IB_SEG_REP and IB_SEG_POS values, and further different segments combined together can occur at a specific SFN.

When the RNC 31 transmits wrong scheduling information via a system information update request message to the Node B 32 during the system information update procedure in UMTS, if the Node B 32 cannot detect an error on the system information BCH PDU before performing the ASN.1 encoding, wrong system information can be transmitted to the UE 40. Furthermore, if an error is not immediately detected, the UE 40 can be placed out of service, thereby reducing reliability of the overall system. Therefore, the Node B 32 needs to be able to detect a scheduling information error and report the error to the CRNC.

Further, in order to generate the BCH PDU efficiently for every SFN ranging from 0 to 4094 and transmit the generated BCH PDU to the UE 40, a method for representing BCH PDU status information of each SFN using the minimum amount of information is necessary. However, such a method has not been available.

SUMMARY OF THE INVENTION

It is, therefore, an object of the present invention to provide a method for encoding a broadcast channel protocol data unit (BCH PDU) based on a broadcast control channel (BCCH) scheduling error in a universal mobile telecommunications system (UMTS), which is capable of detecting a BCCH scheduling error at the Node B and encoding the protocol data unit only if there is no error, thereby preventing a user equipment from being placed in an out of service state caused by sending to the user equipment the broadcast channel protocol data unit encoded by using wrong scheduling information transmitted to the base station (Node B) via a system information update request message.

Another object of the present invention is to provide a method for encoding a broadcast channel protocol data unit (BCH PDU) based on a broadcast control channel (BCCH) scheduling error in a universal mobile telecommunications system (UMTS), which is capable of preventing a BCH PDU with an error from being transmitted to a user equipment by detecting a BCCH scheduling error due to a scheduling information error in a system information update request message at the time of combining system information at the Node B of the UMTS and then canceling the system information update procedure for every SFN if the error is detected.

In accordance with an embodiment of the present invention, there is provided a method for encoding a broadcast channel protocol data unit (BCH PDU) based on a broadcast control channel (BCCH) scheduling error in a universal mobile telecommunications system (UMTS) having a Node B and a radio network controller, the method including:

(a) setting up a call between the radio network controller and the Node B to receive system information and scheduling information for a system information update from the radio network controller;

(b) initializing broadcast channel protocol data units and control information for every system frame number (SFN) at the Node B;

(c) detecting the broadcast control channel scheduling error on the scheduling information for the system information update based on segment types of the system information when combining the system information for every system frame number; and (d) in case the broadcast control channel scheduling error is not detected in the step (c), encoding the broadcast channel protocol data units to be incorporated therein the system information.

In accordance with another embodiment of the present invention, there is provided a method for encoding a broadcast channel protocol data unit (BCH PDU) based on a broadcast control channel (BCCH) scheduling error in a universal mobile telecommunications system (UMTS) having a Node B and a radio network controller, the method including:

(a) setting up a call between the radio network controller and the Node B to receive system information and scheduling information for a system information update from the radio network controller;

(b) initializing broadcast channel protocol data units and control information for every system frame number (SFN) at the Node B;

(c) detecting the broadcast control channel scheduling error on the scheduling information for the system information update based on segment types of the system information when combining the system information for every system frame number;

(d) in case the broadcast control channel scheduling error is not detected in the step (c), encoding the broadcast channel protocol data units to be incorporated therein the system information;

(e) in case the sum of the system frame number and a repetition number of times the error checking is performed for each segment is smaller than a specific value, checking a size of the respective broadcast channel protocol data unit, each broadcast channel protocol data unit having a plurality of segments to be combined with each other, for every system frame unit; and (f) in case the size of the broadcast channel protocol data unit checked in the step (e) is equal to a specific size, sending the broadcast channel protocol data unit for every system frame number encoded in the step (d) to a user equipment.

In accordance with the embodiments of the present invention, a BCCH scheduling error due to a scheduling information error in a system information update request message is detected at the time of combining system information at the Node B of the UMTS, and when the error is detected, the system information update procedure for every SFN is canceled. Accordingly, a BCH PDU with an error can be prevented from being transmitted to a user equipment and thus the user equipment can be prevented from being placed in an out of service state.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

First, scheduling information of system information which is included in a system information update request message sent to a Node B is as follows.

An IB (Information Block) type having values ranging from 0 to 29 is an index which indicates one MIB (Master Information Block), two SBs (Scheduling Blocks) and 27 SIBs (System Information Blocks); and an IB Occurrence Index having values ranging from 0 to 15 is an index indicating the occurrence of each IB.

For each IB Occurrence, IB_SEG_REP indicates a repetition period of the segment, and IB_SEG_COUNT indicates the number of the segments.

Further, for each IB segment, IB_SEG_POS indicates a segment location on the SFN, and each segment is scheduled on the SFN which satisfies SFN mod IB_SEG_REP=IB_SEG_POS.

IB_SEG_TYPE having values ranging from 0 to 6 represents a segment type, while IB_SEG_LENGTH and IB_SEG_DATA respectively indicate a segment length and segment data.

The Node B encodes each BCH PDU including system information by using the above-mentioned information and then sends it to the UE at the corresponding SFN.

In an embodiment of the present invention, storage area for the BCH PDU and BCH PDU control information corresponding to every SFN are provided for the BCH PDU encoding. To be specific, the BCH PDU storage area for a single SFN has 246 bits, and further, the control information for indicating status information on the BCH PDU encoded at each SFN has three bytes. The three bytes control information includes firstSegStartPos, lastSegSize, and totalBitSize.

Herein, firstSegStartPos indicates the existence and location of the first segment of the BCH PDU; lastSegSize indicates the existence and size of the last segment; and totalBitSize indicates the total size of the currently encoded BCH PDU. If the first segment and another segment are combined and encoded, the first segment is always located after another segment. Therefore, a location of the first segment can be determined by a starting position of the first segment. Further, if the last segment and another segment are combined and encoded, the last segment is always located before another segment (it starts at the $15^{th}$ bit position). Since the starting position of the last segment is fixed, location information of the last segment can be accurately represented by lastSegSize.

Accordingly, the scheduling information error detection and the BCH PDU encoding can be efficiently carried out using the control information.

Details of control information of three bytes, i.e. firstSegStartPos, lastSegSize, and totalBitSize, are as follows:

firstSegStartPos with a size of 8 bits indicates a start bit position of the first segment if there is the first segment at the BCH PDU of the corresponding SFN. Otherwise, it is set as 0;

lastSegSize with a size of 8 bits represents a bit size of the last segment if there is the last segment at the BCH PDU of the corresponding SFN. Otherwise, it is set as 0; and totalBitSize with a size of 8 bits is a bit size of the current BCH PDU of the corresponding SFN.

Figure 2A:
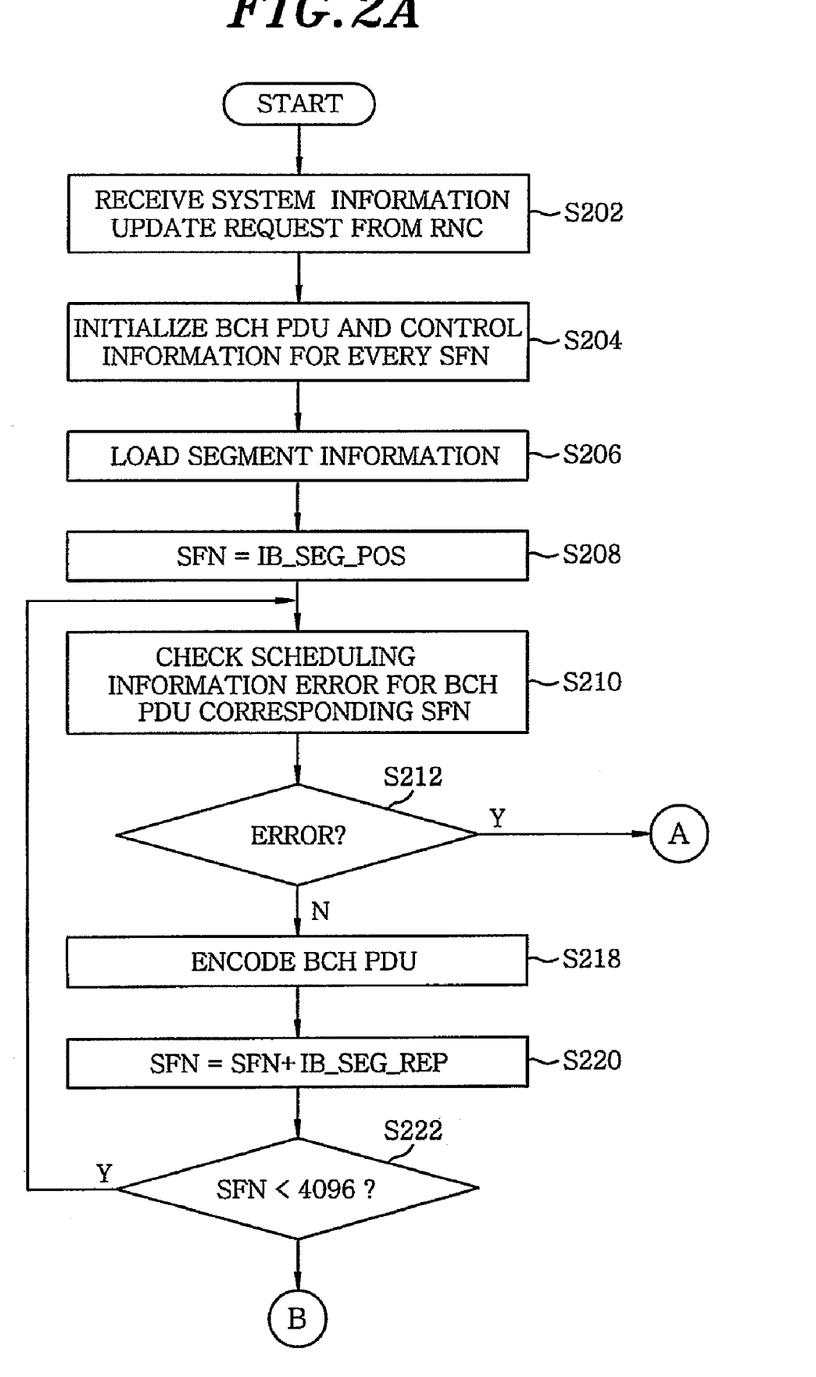
FIGS. 2A and 2B are a flow chart illustrating a BCCH scheduling error detection and BCH PDU encoding process in accordance with an embodiment of the present invention.
Figure 2B:
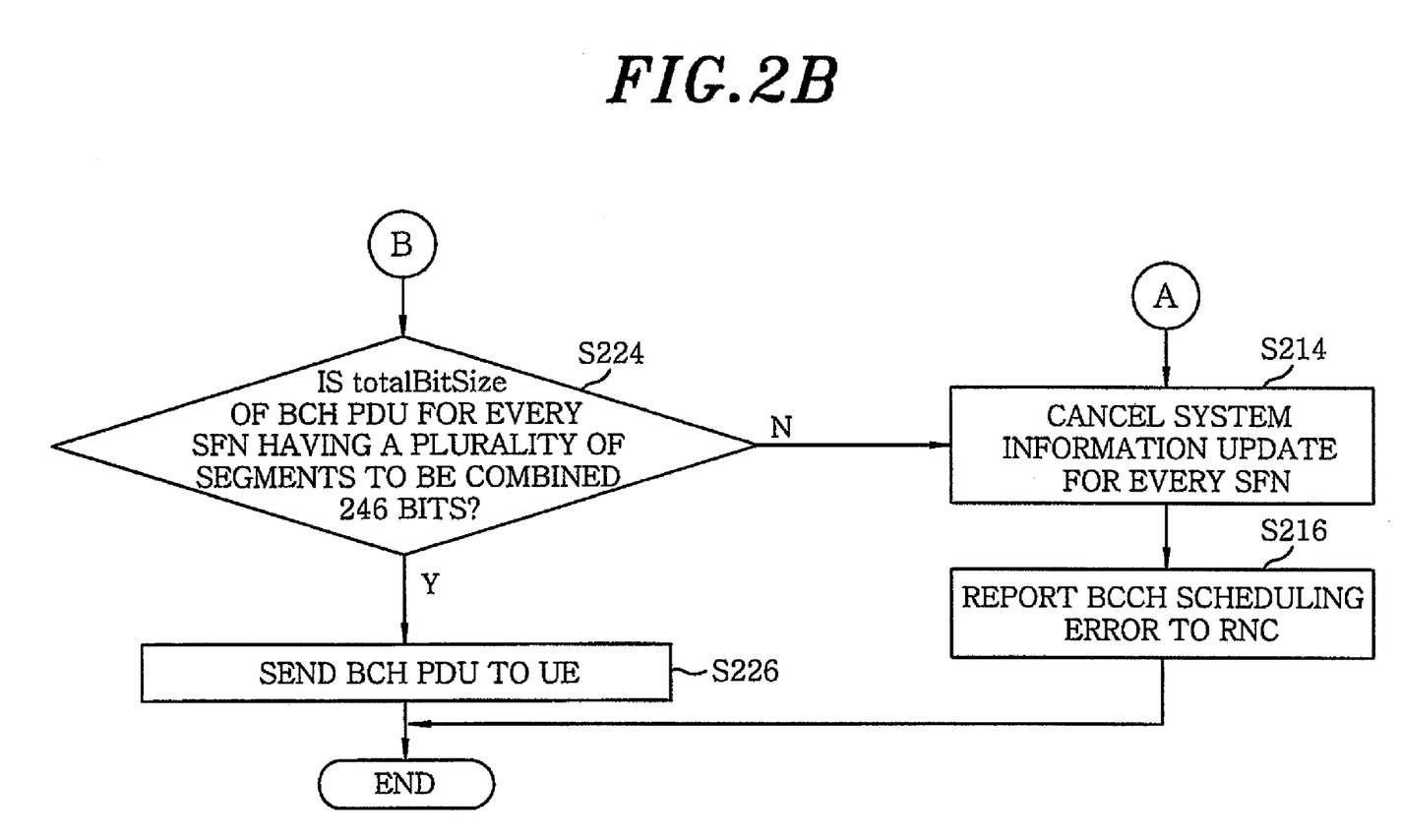
Figure 3A:
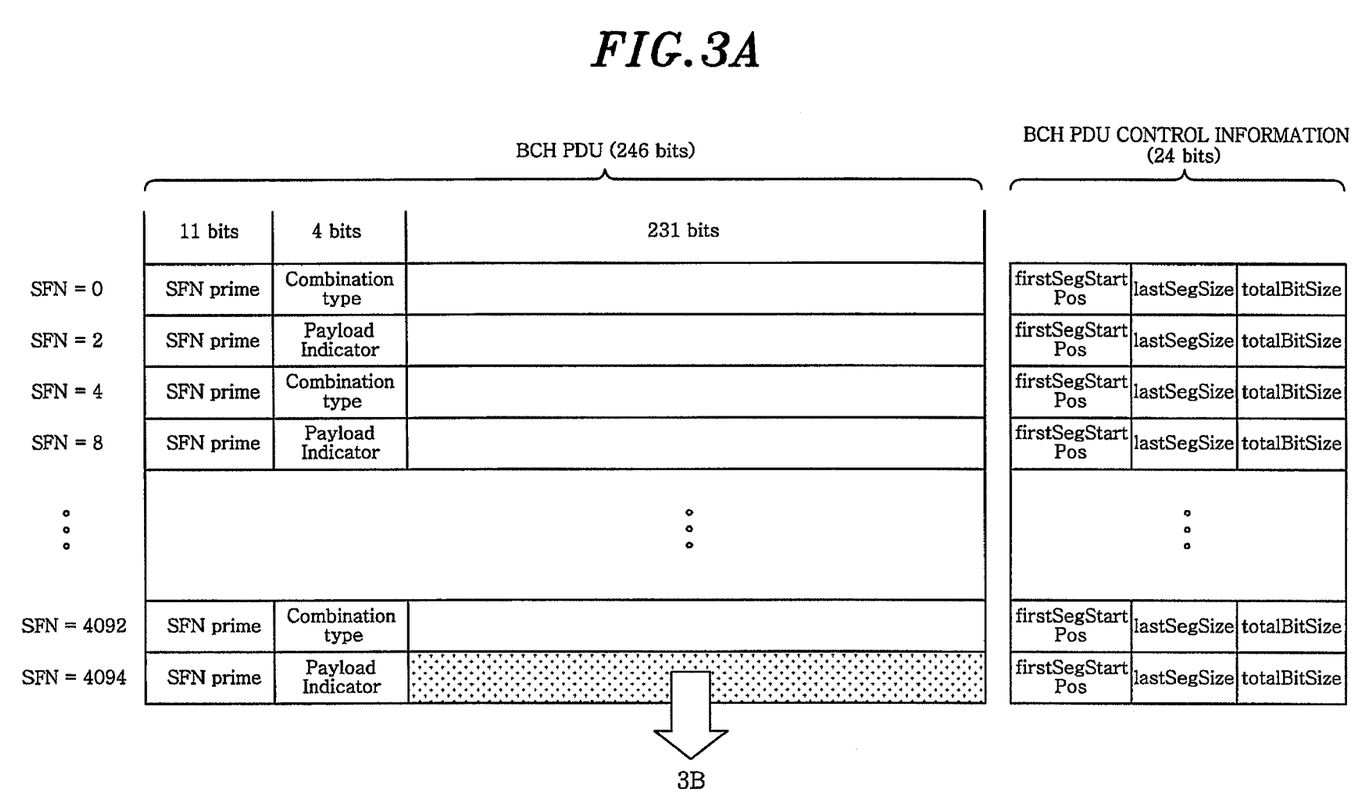
FIGS. 3A and 3B are a configuration view showing a structure of the BCH PDU and BCH PDU control information in accordance with the embodiment of the present invention.
Figure 3B:
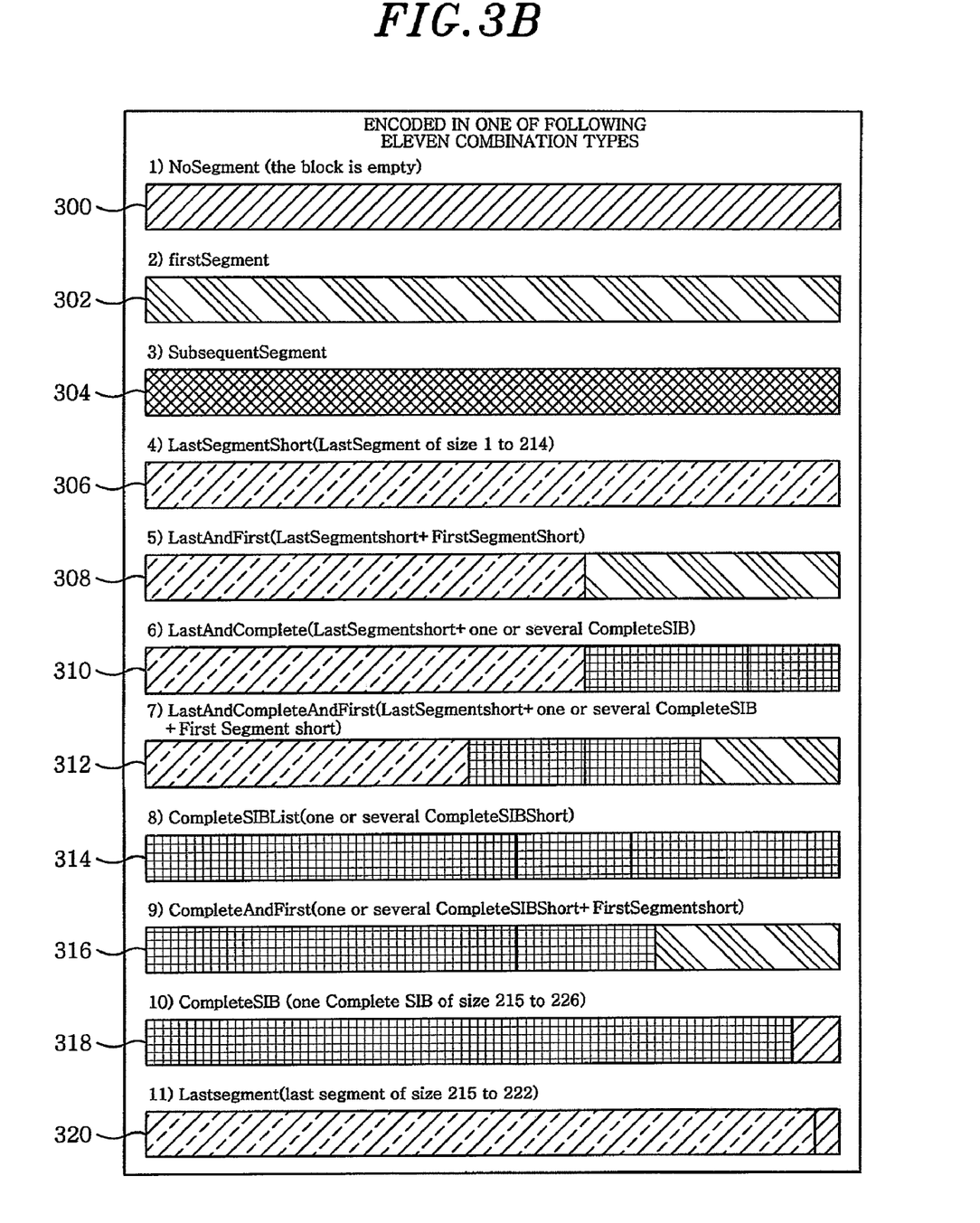

FIGS. 2A and 2B are a flow chart illustrating a BCCH scheduling error detection and BCH PDU encoding process in accordance with the embodiment of the present invention, and FIGS. 3A and 3B are a configuration view showing a structure of the BCH PDU and the BCH control information in accordance with the embodiment of the present invention.

Referring to FIGS. 2A and 2B, if the Node B receives the system information update request message from the RNC in step S202, it renews system information for every SFN in step S204. That is, the Node B initializes the BCH PDU and the control information for every SFN.

Referring to FIGS. 3A and 3B, the SFN prime of the BCH PDU has a value of SFN/2 for every SFN, while the combination type thereof is one of the following eleven types: NoSegment 300, FirstSegment 302, SubsequentSegment 304, LastSegment 306, LastSegment+FirstSegment 308, LastSegment+one or several Completes 310, LastSegment+one or several Completes+FirstSegment 312, One or several Completes 314, One or several Completes+FirstSegment 316, One Complete of size 215 to 226 318, and LastSegment of size 215 to 222 320, whereby the BCH PDU is encoded in one of the combination types.

That is, in step S204, every BCH PDU is initialized as the NoSegment type 300 among the above eleven types 300 to 320. The BCH PDU control information is initialized as follows: lastSegSize=0, firstSegStartPos=0 (there is no segment at an initial stage), and totalBitSize=15 (herein, 11 bits for the SFN prime and 4 bits for the combination type). If a segment is not scheduled on the BCH PDU of the corresponding SFN, the BCH PDU initialized in the NoSegment type 300 is transmitted to the UE.

Current segment information on the segments of the IB occurrence indexes of all IB types is loaded in step S206, and the SFN is set to be IB_SEG_POS in step S208. Subsequently, for the BCH PDU corresponding to the set SFN, a scheduling information error in a system information update is checked on the basis of each segment type in step S210.

Figure 4:
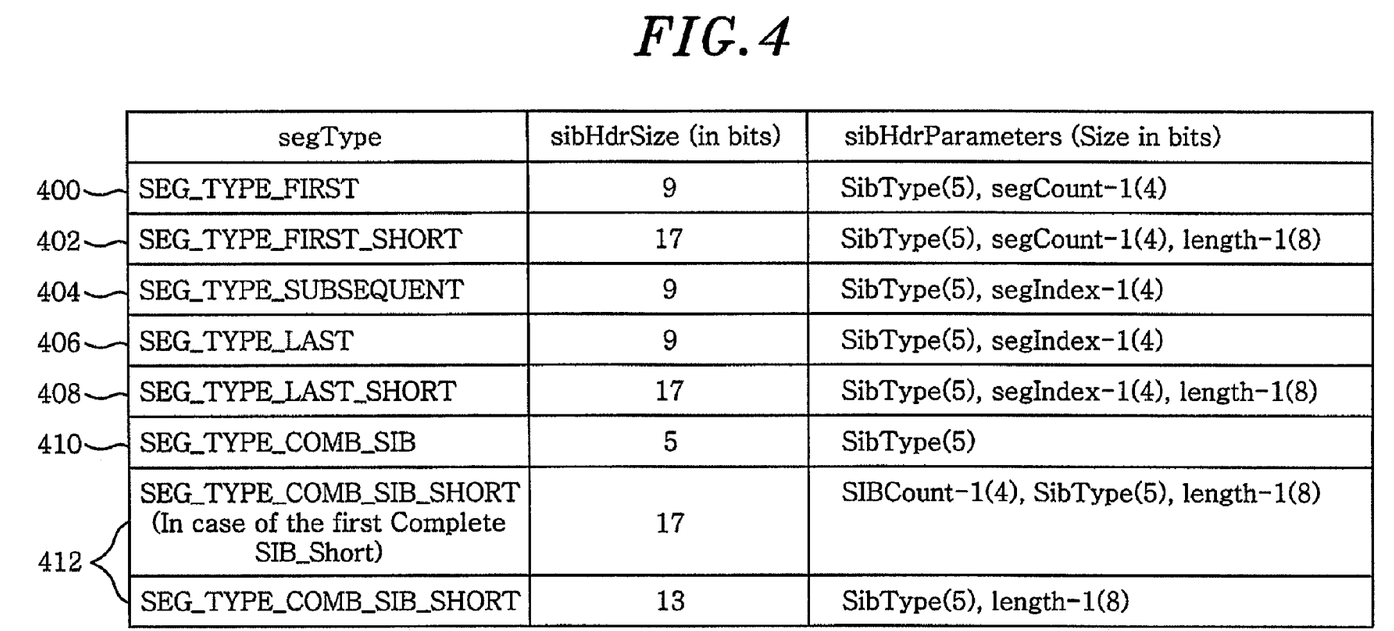
FIG. 4 shows SIB header information of several segment types.

For this, an SIB header size for each segment type is first defined as shown in FIG. 4, which shows the SIB header information of several segment types. Then, a BCH PDU size is calculated as follows:

BCH PDU size=totalBitSize+sibHdrSize+IB_SEG_LENGTH.

Herein, sibHdrSize indicates the SIB header size for each segment type defined as shown in FIG. 4.

After that, a scheduling information error is checked according to each segment type in the following way.

Case 1-1: Segment Type of SEG_TYPE_FIRST 400, SEG_TYPE_SUBSEQUENT 404, SEG_TYPE_LAST 406 or SEG_TYPE_COMPLETE_SIB 410

It is checked whether the BCH PDU control information is the same as the initial information, i.e. firstSegStartPos=0, lastSegSize=0 and totalBitSize=15.

Further, a length error is then checked if BCH PDU size calculated above equals 246 bits.

The segment type of Case 1-1 has a fixed data size and the entire BCH PDU is occupied for transmission. Thus, if a certain segment is already allocated or the BCH PDU size is not 246 bits, it is determined that there is an error in the scheduling information.

Case 1-2: Segment Type of SEG_TYPE_FIRST_SHORT 402

Since a non-zero value firstSegStartPos means that the first segment is already scheduled, it is determined there is an error in the scheduling information. Then, a length error is checked as follows:

BCH PDU size calculated above <=246 bits, and
0<IB_SEG_LENGTH<215.

Case 1-3: Segment Type of SEG_TYPE_LAST_SHORT 408

Since lastSegSize which is not 0 means that the last segment is already scheduled, it is determined that the scheduling information has an error. Then, a length error is checked as follows:

BCH PDU size calculated above <=246 bits;
0<IB_SEG_LENGTH<215.

Case 1-4: Segment Type of SEG_TYPE_COMP_SIB_SHORT 412

Since the segment type of Case 1-4 can be combined with a segment of a certain segment type, only a length error is checked as follows:

BCH PDU size calculated above <=246 bits;
0<IB_SEG_LENGTH<215.

After the error check in step S210, if it is determined in step S212 that there is a scheduling error on the system information update, the procedure proceeds to step S214. The Node B cancels the system information update for every SFN in step S214, and sends a BCCH scheduling error to the RNC in step S216. Here, the Node B does not transmit the BCH PDU with an error to the UE to prevent risk of transmission of wrong system information to the UE in advance.

On the other hand, if it is determined in the step S212 that there is a scheduling error on the system information update, the procedure proceeds to step S218. In the step S218, BCH scheduling without an error is performed on the current SFN using the scheduling information.

In order to efficiently perform the BCH PDU encoding, the embodiment of the present invention employs two parameters, i.e., newSegAddPos and preSegShiftOffset, in addition to the BCH PDU control information. The BCH PDU control information is stored for the case where another segment is combined with the corresponding SFN and it has an influence on the BCH PDU encoding to be performed later, whereas the two parameters are not stored and only influence the current BCH PDU encoding.

As for the two parameters, newSegAddPos indicates a bit position where the current segment is to be added to the BCH PDU of the corresponding SFN, and preSegShiftoffset is a bit value indicating a right shift amount of the segment existing in the BCH PDU of the corresponding SFN.

The embodiment of the present invention performs the BCH PDU encoding in the following sequence according to the segment type of the current segment to be added.

Case 2-1: Segment Type of SEG_TYPE_FIRST, SEG_TYPE_SUBSEQUENT, SEG_TYPE_LAST, or SEG_TYPE_COMPLETE_SIB (a Data Length is Fixed and Only One Segment is Encoded in One BCH PDU)

(1) The combination type is set as FirstSegment, SubsequentSegment, LastSegment or CompleteSIB in sequence based on the segment type.

(2) totalBitSize of the control information is set to be 246.

(3) Since only one segment is encoded in one BCH PDU, encoding information is set as follows:
newSegAddPos=15 (initial value), and
preSegShiftoffset=0.

Case 2-2: Segment Type of SEG_TYPE_FIRST_SHORT (1) A new combination type is set depending on the existing combination type as follows:
in case the existing combination type is NoSegment, the combination type is set to FirstSegment;
in case the existing combination type is LastSegmentShort, the combination type is set to LastAndFirst;
in case the existing combination type is CompleteSIBList, the combination type is set to CompleteAndFirst; and
in case the existing combination type is LastAndComplete, the combination type is set to LastAndCompleteAndFirst.

(2) The control information is updated as follows:
since the first segment is always located after another segment when it is combined and encoded with another segment, firstSegStartPos is set to totalBitSize, and totalBitSize is increased by SibHdrSize+IB_SEG_LENGTH.

(3) Encoding information is set as follows.
since the first segment is always to be located after another segment, newSegAddPos is set to firstSegStartPos, and preSegShiftOffset is set to be 0.

Case 2-3: Segment Type of SEG_TYPE_LAST_SHORT (1) A new combination type is set depending on the existing combination type as follows:
in case the existing combination type is NoSegment, the combination type is set to LastSegment;
in case the existing combination type is FirstSegment, the combination type is set to LastAndFirst;
in case the existing combination type is CompleteSIBList, the combination type is set to LastAndComplete; and
in case the existing combination type is CompleteAndFirst, the combination type is set to LastAndCompleteAndFirst.

(2) The control information is updated as follows:
LastSegSizes is set to SibHdrSize+IB_SEG_LENGTH; and
TotalBitSize is increased by lastSegSize set above.
(3) Encoding information is set as follows:
since the last segment is located at a fixed position, newSegAddPos is set to be 15 (initial value); and
preSegShiftOffset is set to lastSegSize, if there already exists another segment in the BCH PDU, to thereby shift the existing segments to the right.

Case 4: Segment Type of SEG_TYPE_COMPLETE_SIB_SHORT (1) A new combination type is set depending on the existing combination type as follows:
in case the existing combination type is NoSegment, the combination type is set to CompleteSIBList;
in case the existing combination type is FirstSegment, the combination type is set to CompleteAndFirst;
in case the existing combination type is LastSegment, the combination type is set to LastAndComplete; and
in case the existing combination type is LastAndFirst, the combination type is set to LastAndCompleteAndFirst.
(2) Encoding information is set as follows:
in case firstSegStartPos is "0", since a segment is combined next to the existing BCH PDU information, newSegAddPos and preSegShiftoffset are set to totalBitSize and "0", respectively; and
in case firstSegStartPos is not "0", since there is a first segment in the existing BCH PDU and the segment is required to be combined at a bit position before the first segment, newSegAddPos and preSegShiftOffset are set to firstBitStartPos and is SibHdrSize+IB_SEG_LENGTH, respectively.
(3) The control information is updated as follows:
if firstSegStartPo is not "0", it is increased by preSegShiftOffset; and totalBitSize is increased by preSegShiftoffset.

As described above, after all parameters are computed, the segment located at newSegAddPos in the existing BCH PDU is shifted to the right by preSegShiftOffset and then the current segment is inserted at newSegAddPos.

FIGS. 5A to 5E are exemplary views showing the BCH PDU encoding process where the combination type is changed from FirstSegment to LastAndFirst using the above-mentioned encoding method. Below, a BCH PDU encoding process will be described in detail with reference to FIGS. 5A to 5E.

Figure 5A:
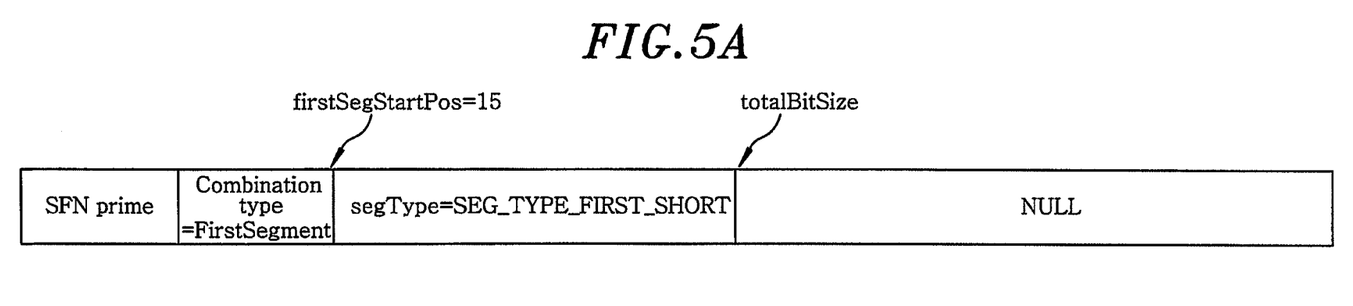
FIGS. 5A to 5E are explanatory views showing a BCH PDU encoding process in accordance with the embodiment of the present invention.
Figure 5B:
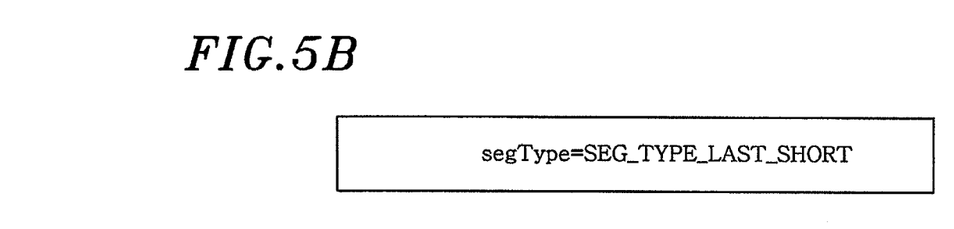

In case of the segment type of SEG_TYPE_FIRST_SHORT is encoded in a BCH PDU, as shown in FIG. 5A, the combination type, firstSegStartPos, and totalBitSize of the control information are set to FirstSegment, an initial totalBitSize (i.e., 15) and sum of the initial totalBitSize and SibHdrSize and IB_SEG_LENGTH of the first segment, respectively. Since the segment type to be added to the BCH PDU is SEG_TYPE_LAST_SHORT as shown in FIG. 5B, the new combination type in FIG. 5C is changed from FirstSegment of the existing combination type to LastAndFirst.

Figure 5C:
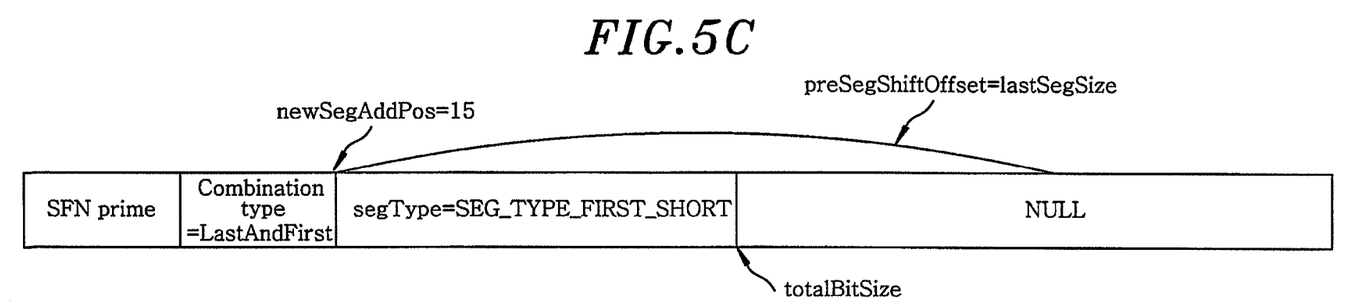
Figure 5D:
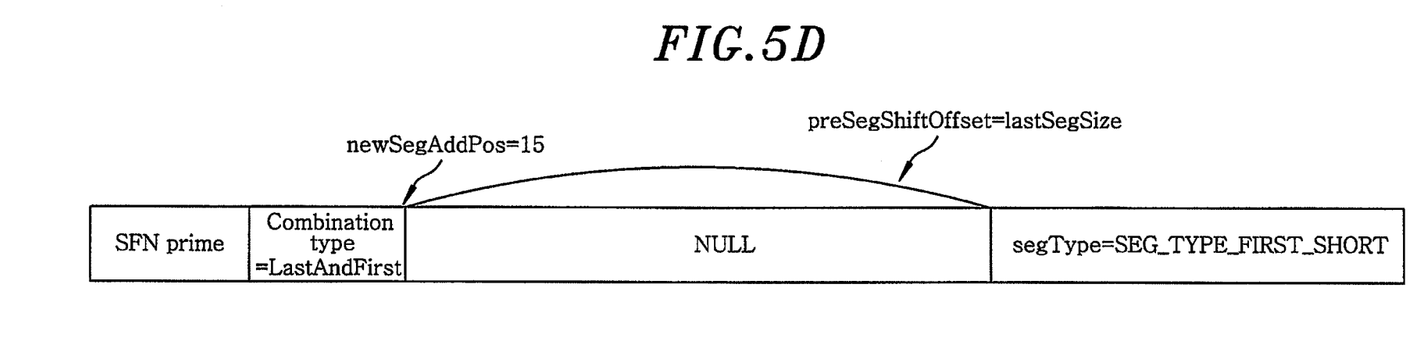
Figure 5E:
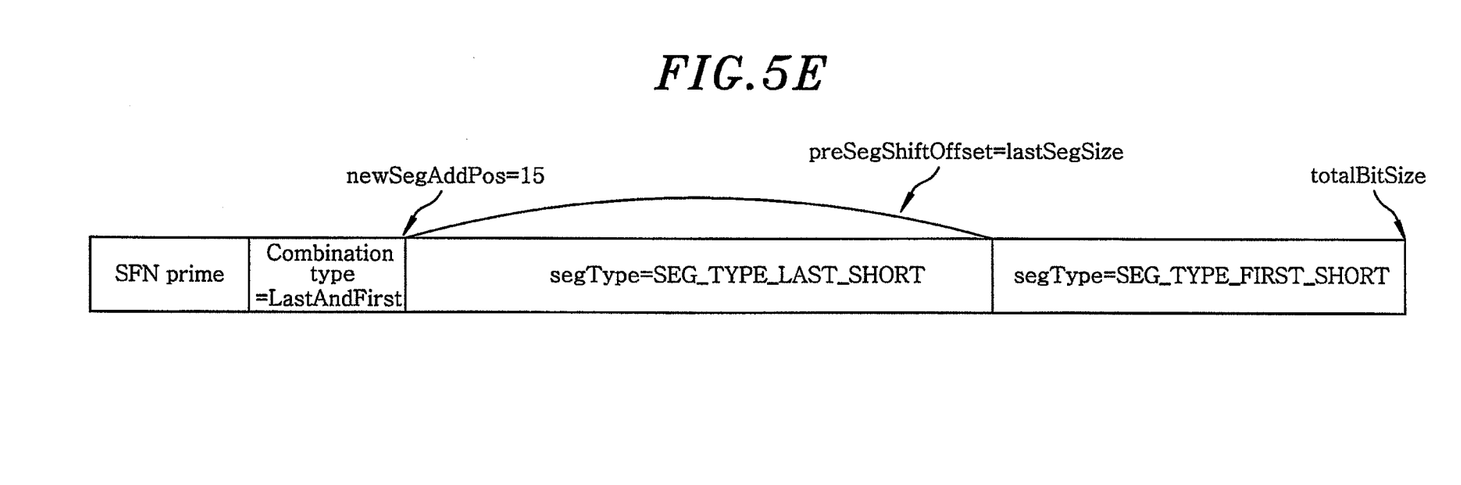

Further, the newSegAddPos and preSegShiftoffset, encoding information, are set to be 15 (initial value) and lastSegSize (i.e., SibHdrSize and IB_SEG_LENGTH of the last segment), respectively, as shown in FIG. 5C. Then, as shown in FIG. 5D, the already encoded segment between newSegAddPos and preSegShiftOffset is shifted to the right by preSegShiftOffset. Finally, the segment in FIG. 5B to be added is inserted at newSegAddPos and totalBitSize is increased by lastSegSize, thereby completing the encoding, as shown in FIG. 5E.

Returning to FIGS. 2A and 2B, if the BCH PDU encoding is completed in the step S218, the SFN value is increased by IB_SEG_REP in step S220, and then, if the increased SFN value is determined to be smaller than 4096 in step S222, the procedure proceeds to the step S210 to repeat the above steps.

If the BCH PDU encoding for every SFN is performed, and if the increased SFN value is 4096, the procedure goes to step S224. In the step S224, it is checked whether totalBitSize of the control information of the BCH PDU whose combination type is for combining one or more segments is 246 bits for every SFN. If there exists a BCH PDU whose combination type is for combining one or more segments, totalBitSize can be identified after the BCH encoding is performed on the segments of the IB occurrence indexes of all IB types. It is because another segment can still be combined with the BCH PDU where 246 bits are not totally filled. If there exists a BCH PDU whose combination type is for combining one or more segments and totalBitSize is not 246 bits, the procedure goes to the step S214, and therefore, the Node B cancels the system information update for every SFN. Further, in the step S216, the Node B sends a BCCH scheduling error to the RNC.

On the contrary, if the BCH PDU for every SFN is generated without an error in the step S224, the Node B sends the BCH PDU to the UE at every 20 ms through the PCCPCH (Primary Common Control Physical Channel) in step S226.

As described above, in accordance with the embodiment of the present invention, it is possible to prevent the BCH PDU with an error from being transmitted to the UE by detecting a BCCH scheduling error caused by the scheduling information error of the system information update when the system information is combined at the Node B of the UMTS and then canceling the system information update for every SFN if the error is detected.

While the invention has been shown and described with respect to the embodiments, it will be understood by those skilled in the art that various changes and modifications may be made without departing from the scope of the invention as defined in the following claims.

What is claimed is:

1. A method for encoding a broadcast channel protocol data unit (BCH PDU) based on a broadcast control channel (BCCH) scheduling error in a universal mobile telecommunications system (UMTS) having a Node B and a radio network controller, the method comprising:
(a) setting up a call between the radio network controller and the Node B to receive system information and scheduling information for a system information update from the radio network controller;
(b) initializing the broadcast channel protocol data unit and control information for every system frame number (SFN) at the Node B;
(c) detecting the broadcast control channel scheduling error on the scheduling information for the system information update based on segment types of the system information when combining the system information for every system frame number; and
(d) in case the broadcast control channel scheduling error is not detected in the step (c), encoding the broadcast channel protocol data unit to be incorporated therein the system information,
wherein, in the step (d), the broadcast channel protocol data unit for every system frame number is encoded using control parameters, each of the control parameters including a first parameter indicating a bit position in the broadcast channel protocol data unit and a second parameter indicating a right shift amount of a segment existing in the broadcast channel protocol data unit, wherein a new segment is to be added into the bit position.

2. The method of claim 1, further comprising:
(e) in case the broadcast control channel scheduling error is detected in the step (c), canceling the system information update for every system frame number and reporting the broadcast control channel scheduling error to the radio network controller.

3. The method of claim 1, further comprising:
(f) in case the broadcast control channel scheduling error is not detected in the step (c), checking a size of the broadcast channel protocol data unit, the broadcast channel protocol data unit having either one segment or at least two segments to be combined with each other, for every system frame number; and
(g) in case the size of the broadcast channel protocol data unit checked in the step (f) is equal to a specific size, sending the broadcast channel protocol data unit for every system frame number encoded in the step (d) to a user equipment.

4. The method of claim 3, wherein the specific size of the broadcast channel protocol data unit is 246 bits.

5. The method of claim 1, wherein the control information indicates status information of the encoded broadcast channel protocol data unit for every system frame number and includes a first control information indicating the existence and location of a first segment in the broadcast channel protocol data unit, a second control information indicating the existence and size of a last segment in the broadcast channel protocol data unit, and a third control information indicating a total size used for encoding the system information in the broadcast channel protocol data unit.

6. The method of claim 5, wherein, in the step (b), the broadcast channel protocol data unit for every system frame number is initialized by setting prime of the broadcast channel protocol data unit to be a half of the system frame number thereof and setting a combination type of the broadcast channel protocol data unit to a value indicating absence of a segment therein; and the control information for every system frame number is initialized by setting the first, the second and the third control information to be "0", "0" and "15", respectively.

7. The method of claim 1, wherein, in the step (d), segments to be encoded in the broadcast channel protocol data unit are classified into four types, and the broadcast channel protocol data unit is encoded differently depending on the types of the segments, and wherein the four types include a first type having SEG_TYPE_FIRST, SEG_TYPE_SUBSEQUENT, SEG_TYPE_LAST, and SEG_TYPE_COMPLETE_SIB; a second type having SEG_TYPE_FIRST_SHORT; a third type having SEG_TYPE_LAST_SHORT; and a fourth type having SEG_TYPE_COMPLETE_SIB_SHORT.

8. A method for encoding a broadcast channel protocol data unit (BCH PDU) based on a broadcast control channel (BCCH) scheduling error in a universal mobile telecommunications system (UMTS) having a Node B and a radio network controller, the method comprising:
(a) setting up a call between the radio network controller and the Node B to receive system information and scheduling information for a system information update from the radio network controller;
(b) initializing the broadcast channel protocol data unit and control information for every system frame number (SFN) at the Node B;
(c) detecting the broadcast control channel scheduling error on the scheduling information for the system information update based on segment types of the system information when combining the system information for every system frame number;
(d) in case the broadcast control channel scheduling error is not detected in the step (c), encoding the broadcast channel protocol data unit to be incorporated therein the system information;
(e) in case a sum of the system frame number and a repetition number of times the error checking is performed for each segment is smaller than a specific value, checking a size of the broadcast channel protocol data unit, the broadcast channel protocol data unit having a plurality of segments to be combined with each other, for every system frame unit; and
(f) in case the size of the broadcast channel protocol data unit checked in the step (e) is equal to a specific size, sending the broadcast channel protocol data unit for every system frame number encoded in the step (d) to a user equipment,
wherein in the step (e), in case a sum of the system frame number and the repetition number of error detection for each segment is smaller than the specific value, the scheduling information error detection is performed again.

9. The method of claim 8, wherein the specific size of the broadcast channel protocol data unit is 246 bits.

10. The method of claim 8, further comprising:
(g) in case the broadcast control channel scheduling error is detected in the step (c), canceling the system information update for every system frame number and reporting the broadcast control channel scheduling error to the radio network controller.

11. The method of claim 8, wherein the specific value is 4096.

* * * * *